US006772407B1

(12) United States Patent
Leymann et al.

(10) Patent No.: US 6,772,407 B1
(45) Date of Patent: Aug. 3, 2004

(54) STAGING OBJECTS IN WORKFLOW MANAGEMENT SYSTEMS

(75) Inventors: Frank Leymann, Aidlingen (DE); Dieter Roller, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/405,638

(22) Filed: Sep. 24, 1999

(30) Foreign Application Priority Data

Oct. 2, 1998 (EP) .......................................... 98118707

(51) Int. Cl.$^7$ ................................................ G06F 9/44
(52) U.S. Cl. ........................................ 717/100; 705/8
(58) Field of Search ............................... 717/100, 128; 707/202, 10; 705/1, 8, 9; 709/201

(56) References Cited

U.S. PATENT DOCUMENTS

| 5,535,322 | A | * | 7/1996 | Hecht ............................ 705/1 |
| 6,014,673 | A | * | 1/2000 | Davis et al. ................. 707/202 |
| 6,308,163 | B1 | * | 10/2001 | Du et al. ....................... 705/8 |

OTHER PUBLICATIONS

"Template Software Rolls Out Corporate and Product Growth Strategies at Solutions '97 Conference", PR Newswire, Apr. 3, 1997.*
"Template Software Stregthens Core Product Family With Ease–Of–Use and Functionality Enhancements that Promo□□ Unparalleled Software Reuse", PR Newswire Association, Jun. 23, 1997.*
"Using the WFT Development Environment", Version 8.0, Workflow Template, Template Software Inc. Aug. 1997.*
"Development a WFT Workflow System", Version 8.0, Workflow Template, Template Software Inc., Aug. 1997.*
"Software Design Methods for Concurrent and Real Time Systems", Gomaa, pp. 1–151, Jul. 9, 1993.*
IBM MQSeries Workflow Getting Started with Buildtime version 3.1.2, pp. 1–9, Dec. 1998.*
InfoWorld Product Release, Message Queing Applications Released from Platform Confines Message Queuing Exchanges Data Between Apps Regarless of Platform, Maggie Biggs, pp. 1–9, published Feb. 23, 1998.*
Windows NT Server—Microsoft Message Queuing Services, Release 1.0 Microsoft Press, pp. 1–38, published 1997.*
Microsoft Message Queue Server, Microsoft Press, Beta 2, published 1997, pp. 1–23.*
"Messaging & Queuing Using the MQI", Burnie Blakely et al. whole manual, published Jun. 26, 1995.*
Trademark registration for MQSERIES of IBM as recorded in Trademark Electronic Search System (TESS) filed Nov. 30, 1993.*
Leymann & Roller, Production Workflow Concepts and Techniques (Prentice–Hall 2000), Section 11.3, pp. 435–7.

D. J. Spohn, "Project Management Environment", IBM Technical Disclosure Bulletin, vol. 32, No. 9A, Feb. 1990, pp. 250–254.
H. A. Inniss and J. H. Sheridan, "Workflow Management Based on an Object–Oriented Paradigm", IBM Technical Disclosure Bulletin, vol. 37, No. 03, Mar. 1994, p. 185.
Ronni T. Marshak, "Workflow as Middleware. Does It Need to Be Visible to Be Workflow?", Workgroup Report, vol. 17, No. 5, p. 2.
Frank Leymann, "A Meta Model to Support Modelling and Execution of Processes", Proceedings of the 11th European Meeting on Cybernetics and System Research EMCR92, Vienna, Austria, Apr. 21–24, 1992, World Scientific, 1992, pp. 287–294.
IBM Introducing FlowMark for OS/2, Document No. GH19–8215–01, IBM Corporation, Second Edition (Mar. 1994).
F. Leymann and W. Altenhuber, "Managing business processes as an information resource", IBM Systems Journal, vol. 32, No. 2, 1994, pp. 326–348.
Ronni T. Marshak, "IBM's FlowMark, Object–Oriented Workflow for Mission–Critical Applications", Workgroup Computing Report, vol. 17, No. 5, 1994, pp. 3–13.
Frank Leymann and Dieter Roller, "Business Process Management with FlowMark", Digest of papers, Cat. No. 94CH3414–0, Spring COMPCON 94, 1994, pp. 230–234.
"Getting Started with Runtime", IBM MQSeries Workflow, Version 3.2, Second Edition (Jun. 1999), Document No. SH12–6287–01 (update version of SH12–6287–00, which is no longer available). Whole manual.
"Concepts and Architecture", IBM MQSeries Workflow, Version 3.2, Second Edition (Jun. 1999), Document No. GH12–6285–01 (update version of GH12–6285–00, which is no longer available). Whole manual.
"Getting Started with Buildtime", IBM MQSeries Workflow, Version 3.1.2, Third Edition (Dec. 1998), Document No. SH12–6286–02 (update version of SH12–6286–01, which is no longer available). Whole manual.
"Modeling Workflow", IBM FlowMark, Version 2 Release 3, Third Edition (Dec. 1996), Document No. SH19–8241–02. Whole manual.

* cited by examiner

Primary Examiner—Todd Ingberg
(74) Attorney, Agent, or Firm—Roy W. Truelson

(57) ABSTRACT

The present invention relates to a device within and a method processed by a Workflow Management System (WFMS) making resources/objects accessible to activities of said WFMS processing these resources/objects. The Workflow-Management-System (WFMS) according the current invention comprises a WFMS-server said WFMS-server performs navigation through a process-model and performs resolution by selecting a next-process-activity to be executed by said WFMS, and by selecting a WFMS-agent to execute said next-process-activity. The current invention teaches a stager storing, after the WFMS performing said resolution, resources required for execution of said next-process-activity from one or a multitude of source-locations onto a WMF-staging-location. Afterwards the WFMS-agent uses said resources from said WFMS-staging-location for execution of said next-process-activity.

13 Claims, 4 Drawing Sheets

STAGING OBJECTS IN WORKFLOW MANAGEMENT SYSTEMS

FIELD OF THE INVENTION

The present invention relates to a device within and a method processed by a Workflow Management System (WFMS). More particularly, the invention relates to a device and a method making resources/objects accessible to activities of said WFMS processing these resources/objects.

BACKGROUND OF THE INVENTION

A new area of technology with increasing importance is the domain of Workflow-Management-Systems (WFMS). WFMS support the modeling and execution of business processes. Business processes control which piece of work of a network of pieces of work will be performed by whom and which resources are exploited for this work, i.e. a business process describes how an enterprise will achieve its business goals. The individual pieces of work might be distributed across a multitude of different computer systems connected by some type of network.

The process of designing, developing and manufacturing a new product and the process of changing or adapting an existing product presents many challenges to product managers and engineers to bring the product to market for the least cost and within schedule while maintaining or even increasing product quality. Many companies are realizing that the conventional product design process is not satisfactory to meet these needs. They require early involvement of manufacturing engineering, cost engineering, logistic planning, procurement, manufacturing, service and support with the design effort. Furthermore, they require planning and control of product data through design, release, and manufacturing.

The correct and efficient execution of business processes within a company, e.g. development or production processes, is of enormous importance for a company and has significant influence on company's overall success in the market place. Therefore, those processes have to be regarded similar as technology processes and have to be tested, optimized and monitored. The management of such processes is usually performed and supported by a computer based process or workflow management system.

In D. J. Spoon: "Project Management Environment", IBM Technical Disclosure Bulletin, Vol. 32, No. 9A, February 1990, pages 250 to 254, a process management environment is described including an operating environment, data elements, and application functions and processes.

In R. T. Marshak: "IBM's FlowMark, Object-Oriented Workflow for Mission-Critical Applications", Workgroup Computing Report (USA), Vol. 17, No. 5, 1994, page 3 to 13, the object character of IBM FlowMark as a client/server product built on a true object model that is targeted for mission-critical production process application development and deployment is described.

In H. A. Inniss and J. H. Sheridan: "Workflow Management Based on an Object-Oriented Paradigm", IBM Technical Disclosure Bulletin, Vol. 37, No. 3, March 1994, page 185, other aspects of object-oriented modeling on customization and changes are described.

In F. Leymann and D. Roller: "Business Process Management with FlowMark", Digest of papers, Cat. No. 94CH3414-0, Spring COMPCON 94, 1994, pages 230 to 234, the state-of-the-art computer process management tool IBM FlowMark is described. The meta model of IBM FlowMark is presented as well as the implementation of IBM FlowMark. The possibilities of IBM FlowMark for modeling of business processes as well as their execution are discussed. The product IBM FlowMark is available for different computer platforms and documentation for IBM FlowMark is available in every IBM branch.

In F. Leymann: "A meta model to support the modeling and execution of processes", Proceedings of the 11 th European Meeting on Cybernetics and System Research EMCR92, Vienna, Austria, Apr. 21 to 24, 1992, World Scientific 1992, pages 287 to 294, a meta model for controlling business processes is presented and discussed in detail.

The "IBM FlowMark for OS/2", document number GH 19-8215-01, IBM Corporation, 1994, available in every IBM sales office, represents a typical modern, sophisticated, and powerful workflow management system. It supports the modeling of business processes as a network of activities; refer for instance to "Modeling Workflow", document number SH 19-8241, IBM Corporation, 1996. As further information on Workflow Management Systems available in IBM sales offices one could mention: IBM MQSeries Concepts and Architecture, document number GH 12-6285; IBM MQSeries Getting Started with Buildtime, document number SH 12-6286; IBM MQSeries Getting Started with Runtime, document number SH 12-6287. This network of activities, the process model, is constructed as a directed, acyclic, weighted, colored graph. The nodes of the graph represent the activities or workitems which are performed. The edges of the graph, the control connectors, describe the potential sequence of execution of the activities. Definition of the process graph is via the IBM FlowMark Definition Language (FDL) or the built-in graphical editor. The runtime component of the workflow manager interprets the process graph and distributes the execution of activities to the right person at the right place, e. g. by assigning tasks to a work list according to the respective person, wherein said work list is stored as digital data within said workflow or process management computer system.

In F. Leymann and W. Altenhuber: "Managing business processes as an information resource", IBM Systems Journal, Vol. 32(2), 1994, the mathematical theory underlying the IBM FlowMark product is described.

In D. Roller: "Verifikation von Workflows in IBM FlowMark", in J. Becker und G. Vossen (Hrsg.): "Geschaeftsprozessmodellierung und Workflows", International Thompson Publishing, 1995, the requirement and possibility of the verification of workflows is described. Furthermore the feature of graphical animation for verification of the process logic is presented as it is implemented within the IBM FlowMark product.

For implementing a computer based process management system, firstly the business processes have to be analyzed and, as the result of this analysis, a process model has to be constructed as a network of activities corresponding to the business process. In the IBM FlowMark product, the process models are not transformed into an executable. At run time, an instance of the process is created from the process model, called a process instance. This process instance is then interpreted dynamically by the IBM FlowMark product.

A user typically interacts with the workflow management system via a graphical end user that represents the tasks to be performed by the user as icons. Work for a particular task is started by the user by double-clicking on the appropriate icon which in turn starts the program implementing the activity.

It is important for the productivity of the user that the program complete its access to data as fast as possible to avoid delays in interacting with the user. In many cases WFMS are executed by a multitude of distributed computer systems accessing resources/objects which also are spread across the computer network. In such a distributed environment a user who controls execution of an activity assigned as a work item to him could suffer severe performance degradation until the system has been able to provide him with all required resources/objects. The problem becomes even worse if the activity has to access large resources/objects or if the activity requires access to a large number of resources/objects distributed across a large number of different computer systems.

Objective of the Invention

The invention is based on the objective of improving the performance of the access of a WFMS activity activated by a user to resources/objects required by said activity. It is an objective at the same time to optimize the communication traffic of an activity accessing resources/objects during execution.

Summary and Advantages of the Invention

The invention relates to one or a multitude of computer systems acting as a Workflow-Management-System (WFMS), wherein said WFMS comprises a process-model defining at least one process-activity managed and executed by said WFMS and wherein said WFMS comprises a WFMS-server, said WFMS-server performing navigation through said process-model and performing resolution. Resolution is done by selecting a next-process-activity to be executed by said WFMS, and by selecting a WFMS-agent to execute said next-process-activity. According to the present invention said computer system comprises a stager storing, after performing said resolution, resources required for execution of said next-process-activity from one or a multitude of source-locations at a WMF-staging-location. Said WFMS-agent uses said resources from said WFMS-staging-location for execution of said next-process-activity.

The technique proposed by the present invention significantly improves performance with respect to the access of an executing activity to resources accessed by said activity. This is due to the fact that all resources required by said activity can be stored to and made available by an arbitrary WFMS staging location being placed "closer" (in terms of access time, for instance due large bandwidth or huge processing power) to the system executing the activity. This increases the productivity of the user as the program completes its access to data as fast as possible to avoid delays in interacting with the user. The teaching of the present invention is of specific advantage as in many cases WFMS are executed by a multitude of distributed computer systems accessing resources/objects which also are spread across the computer network. In such a distributed environment a user who controls execution of an activity assigned as a work item to him could suffer severe productivity degradation until the system has been able to provide him with all required resources/objects; the present solutions avoids this. The advantages are also remarkable if the activity has to access large resources/objects or if the activity requires access to a large number of resources/objects distributed across a large number of different computer systems. Finally the present invention would reduce the network traffic as it is more economical to transfer a certain amount of data in a single bulk data transfer compared to the situation of transferring the same amount of data via a larger number of transfer requests. Moreover, the suggested teaching is flexible in the sense that it is not required to adapt the program implementing the activity in any way. The present invention does not enforce the stager to be a component of the WFMS (of course that could be the case), offering large spectrum of implementation possibilities. For instance, the stager could also be implemented as an "exit".

Additional advantages are accomplished by a WFMS wherein said WFMS-agent stores output generated by execution of said next-process-activity at said WFMS-staging-location and said WFMS, after completion of said next-process-activity, stores said output to said source-location.

Due to such a teaching also the manipulative access to the resources is supported and experiences significant speed-up for write/modify access.

Additional advantages are accomplished if said storing of said output is performed by said stager.

As the stager takes care to write the generated output back to the original storage locations the present teaching is completely transparent to the level of programs implementing activities. The complexity of implementing such programs is therefore reduced. The staging facility has to be implemented once but can be exploited by all programs.

Additional advantages are accomplished by said WFMS, wherein said stager is called by said WFMS-server or by said WFMS-agent.

The WFMS-server or the WFMS-agent are the optimal instance to call the stager as both of them have the knowledge when one activity has terminated and the WFMS is ready to process the next activity according the process model. Thus the overall processing effort is minimized if either the WFMS server or the WFMS client is responsible for calling the stager. This is at least true as far as the stager is storing, after completion of said next-process-activity, the output to said source location. In a WFMS in which navigation is performed by the WFMS only, it might be a better choice to invoke the stager by the WFMS server. The latter approach would guarantee data consistency as the WFMS server would not invoke the next process activity before the stager has stored the output to the source location.

Additional advantages are accomplished if said resources comprise data and/or a program required for execution of said next-process-activity.

On one hand flexibility of the present teaching is increased, if no limitation is imposed upon the nature of the resources. On the other hand supporting both, data and code, makes the present approach open for object-oriented approaches. Even more, the present teaching could also be used to stage the program implementing the activity to be executed by a user to the WFMS staging location; thus the WFMS agent would be enabled to access that program faster for its execution.

Additional advantages are accomplished if said WFMS-staging-location is selected dynamically from a predefined set of WFMS-staging-locations. Moreover it is advantageous to select said WFMS-staging-location such that said resources can be accessed on said WFMS-staging-location with improved performance compared to an access from their source-location.

A dynamic selection process allows the WFMS to take into account for the selection all changes occurring within the WFMS up to the point in time of the selection. Moreover the selection can also consider the system load, transmission load within the network etc. for an optimal selection of an WFMS staging location.

Additional advantages are accomplished if said stager is located on said WFMS-server.

As the WFMS server stores the complete process model and the activities are parts of it, all knowledge required for the stager to perform its work is available on the WFMS server. If the WFMS server and the stager share a common system, communication overhead within a distributed environment is minimized.

According to a further embodiment of the invention said WFMS performs said resolution by further selecting a WFMS-client to control execution of said next-process-activity by a work-item and said WFMS providing said work-item to said WFMS-client. Additional advantages are accomplished by not presenting said work-item to a user before said resources have been stored to said WFMS-staging-location.

As a work item is presented to the user after the resources have been stored to the WFMS staging location (from where they can be accessed in an optimal way) the user will not realize the processing time (latency period) required to make the resources available at the WFMS staging sever. The user will fully enjoy the performance improvements.

According to a further embodiment of the invention, said process-activity has associated with it at least one input-container. Additional advantages are accomplished if said resources are determined from the contents of said input-container of said next-process-activity. Further advantages are achieved if said stager determines said resources.

These features of the present invention allow implementation of the invention within an existing WFMS with minimal modifications to the WFMS. As an input container already stores information regarding which data the corresponding activity will require for its processing, a separate stager could exploit this information for locating these resources, transferring and storing the resources on the WFMS staging location.

According to a further embodiment of the invention said WFMS-staging-location and said WFMS-agent are located on the same computer system, or said WFMS-client and said WFMS-agent are located on the same computer system, or said WFMS-staging-location, said WFMS-agent and said WFMS-client are located on the same computer system.

According to the various characteristics of the actual distributed processing environment the present teaching suggests instantiating the WFMS staging location, the WFMS agent and the WFMS-client on the same or different computer systems for achieving the best performance results. In most cases performance is optimal if the WFMS staging location, the WFMS agent and the WFMS-client are located on the same computer system.

According to a further embodiment of the invention access to said WFMS-staging-location is managed through a WMFS-staging-server.

With this feature the implementation of a stager could be simplified as the knowledge of how to access the resources staged to the WFMS staging location is provided by the separate WFMS staging server.

Another embodiment of the invention relates to a method of staging resources in a Workflow-Management-System (WFMS), wherein said WFSM comprises a process-model defining at least one process-activity managed and executed by said WFMS and said WFMS performs navigation through said process-model. The proposed method comprises a resolution-step, wherein a next-process-activity to be executed by said WFMS is selected, and wherein a WFMS-agent to execute said next-process-activity is selected. The proposed method further comprises a staging-step storing resources required for execution of said next-process-activity from one or a multitude of source-locations at a WMF-staging-location. Moreover the proposed method comprises a usage-step, wherein said WFMS-agent uses said resources from said WFMS-staging-location for execution of said next-process-activity.

With respect to the advantages achieved by said method features refer to the corresponding device features discussed above.

According to a further embodiment of the invention a method of staging resources is taught wherein in said usage-step said WFMS-agent is storing output generated by execution of said next-process-activity onto said WFMS-staging-location. In addition said method comprises a restore-step succeeding said usage-step, wherein after completion of said next-process-activity, said output is restored to said source-location.

With respect to the advantages achieved by said method features refer to the corresponding device features discussed above.

According to a further embodiment of the invention a method of staging resources is taught wherein said resources comprise data and/or a program required for execution of said next-process-activity.

With respect to the advantages achieved by said method features refer to the corresponding device features discussed above.

According to a further embodiment of the invention a method of staging resources is taught wherein in said staging-step said WFMS-staging-location is selected such that said resources can be accessed on said WFMS-staging-location with improved performance compared to an access from their source-location.

With respect to the advantages achieved by said method features refer to the corresponding device features discussed above.

According to a further embodiment of the invention, a method of staging resources is taught which comprises a work-item-presentation-step succeeding said staging-step and presenting a work-item to a user, said work-item allowing said user to control execution of said next-process-activity from a WFMS-client.

With respect to the advantages achieved by said method features refer to the corresponding device features discussed above.

According to a further embodiment of the invention, a method of staging resources is taught wherein in said staging-step said resources are determined from the contents of one or more input-containers of said next-process-activity, said input-containers being associated with said next-process-activity.

With respect to the advantages achieved by said method features refer to the corresponding device features discussed above.

DESCRIPTION OF THE PREFERRED EMBODIMENT

Figure 1:
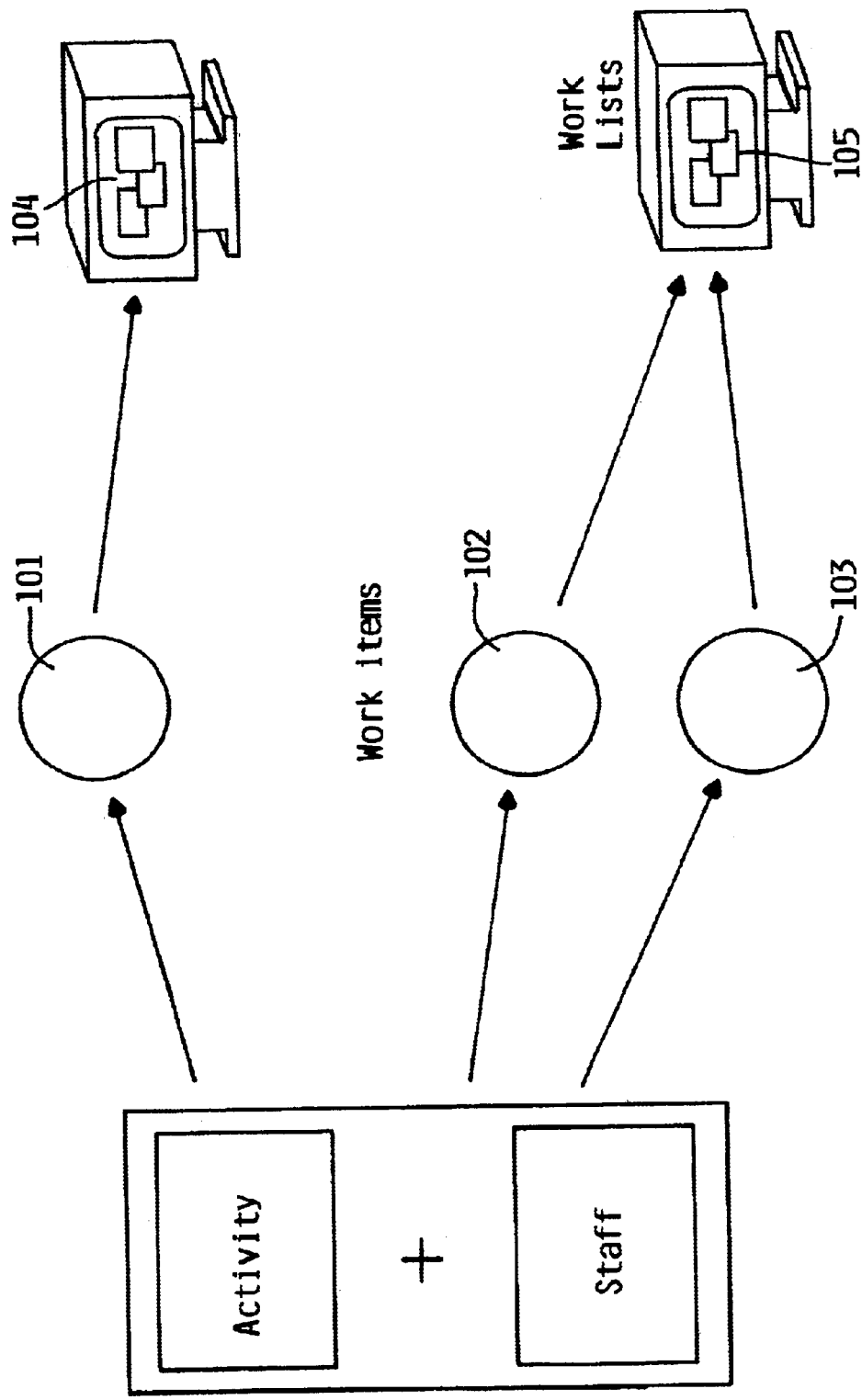
FIG. 1 is a diagram reflecting the first phase of the execution of an activity in a WFMS showing the creation of work items.

The present invention is illustrated based on IBM's Flow-Mark workflow management system. Of course any other WFMS could be used instead. Furthermore the present teaching applies also to any other type of system which offers WFMS functionalities not as a separate WFMS but within some other type of system.

Throughout the specification the terms "resources" and "objects" are used interchangeably referring to any kind of data or programs or combinations thereof. While the term "object" is a terminology more focused on the object-oriented side, the term "resource" reflects the more traditional view.

Introduction

The following is a short outline on the basic concepts of a workflow management system based on IBM's FlowMark WFMS:

From an enterprise point of view the management of business processes is becoming increasingly important: business processes or process for short control which piece of work will be performed by whom and which resources are exploited for this work, i.e. a business process describes how an enterprise will achieve its business goals. A WFMS may support both the modeling of business processes and their execution.

Modeling of a business process as a syntactical unit in a way that is directly supported by a software system is extremely desirable. Moreover, the software system can also work as an interpreter basically getting as input such a model: The model, called a process model or workflow model, can then be instantiated and the individual sequence of work steps depending on the context of the instantiation of the model can be determined. Such a model of a business process can be perceived as a template for a class of similar processes performed within an enterprise; it is a schema describing all possible execution variants of a particular kind of business process. An instance of such a model and its interpretation represents an individual process, i.e. a concrete, context dependent execution of a variant prescribed by the model. A WFMSs facilitates the management of business processes. It provides a means to describe models of business processes (build time) and it drives business processes based on an associated model (run time). The meta model of IBM's WFMS FlowMark, i.e. the syntactical elements provided for describing business process models, and the meaning and interpretation of these syntactical elements, is described next.

A process model is a complete representation of a process, comprising a process diagram and the settings that define the logic behind the components of the diagram. Using various services provided by FlowMark these buildtime definitions of the process models are then converted into process templates for use by FlowMark at runtime. Components of a FlowMark process model are:

Processes
Activities
Blocks
Control Flows
Connectors
Data Containers
Data Structures
Conditions
Programs
Staff Not all of these elements will be described below.

On this background a process, modeled by a process model within FlowMark, is a sequence of activities that must be completed to accomplish a task. The process is the top-level element of a FlowMark workflow model. In a FlowMark process, it can be defined as:

How work is to progress from one activity to the next

Which persons are to perform activities and what programs they are to use

Whether any other processes, called subprocesses, are nested in the process

Of course multiple instances of a FlowMark process can run in parallel.

Activities are the fundamental elements of the meta model. An activity represents a business action that is from a certain perspective a semantical entity of its own. With the model of the business process it might have a fine-structure that is then represented in turn via a model, or the details of it are not of interest at all from a business process modeling point of view. Refinement of activities via process models allows for both the modeling of business processes bottom-up and top-down. Activities, being steps within a process, represent pieces of work that the assigned person can complete by starting a program or another process. In a process model, the following information is associated with each activity:

What conditions must be met before the activity can start

Whether the activity must be started manually by a user or can start automatically What condition indicates that the activity is complete Whether control can exit from the activity automatically or the activity must first be confirmed as complete by a user How much time is allowed for completion of the activity Who is responsible for completing the activity Which program or process is used to complete the activity What data is required as input to the activity and as output from it A FlowMark process model consists of the following types of activities: Program activity: Has a program assigned to perform it. The program is invoked when the activity is started. In a fully automated workflow, the program performs the activity without human intervention. Otherwise, the user must start the activity by selecting it from a runtime work list. Output from the program can be used in the exit condition for the program activity and for the transition conditions to other activities.

Process activity: Has a (sub-)process assigned to perform it. The process is invoked when the activity is started. A process activity represents a way to reuse a set of activities that are common to different processes. Output from the process can be used in the exit condition for the process activity and for the transition conditions to other activities.

The flow of control, i.e. the control flow through a running process, determines the sequence in which activities are executed. The FlowMark workflow manager navigates a path through the process that is determined by the evaluation to TRUE of start conditions, exit conditions, and transition conditions.

The results that are in general produced by the work represented by an activity are put into an output container, which is associated with each activity. Since an activity will in general be required to access output containers of other activities, each activity is associated in addition with an input container too. At run time, the actual values for the formal parameters building the input container of an activity represent the actual context of an instance of the activity. Each data container is defined by a data structure. A data structure is an ordered list of variables, called members, that have a name and a data type. Data connectors represent the transfer of data from output containers to input containers. When a data connector joins an output container with an input container, and the data structures of the two containers match exactly, the FlowMark workflow manager maps the data automatically.

Connectors link activities in a process model. Using connectors, one defines the sequence of activities and the transmission of data between activities. Since activities might not be executed arbitrarily they are bound together via control connectors. A control connector might be perceived as a directed edge between two activities; the activity at the connector's end point cannot start before the activity at the start point of the connector has finished (successfully). Control connectors thus model the potential flow of control within a business process model. Default connectors specify where control should flow when the transition condition of no other control connector leaving an activity evaluates to TRUE. Default connectors enable the workflow model to cope with exceptional events. Data connectors specify the flow of data in a workflow model. A data connector originates from an activity or a block, and has an activity or a block as its target. One can specify that output data is to go to one target or to multiple targets. A target can have more than one incoming data connector.

Conditions are the means by which it is possible to specify the flow of control in a process. In FlowMark process models logical expressions can be defined that are evaluated by FlowMark at runtime to determine when an activity may start, end, and pass control to the next activity. Start conditions are conditions that determine when an activity with incoming control connectors can start. The start condition may specify that all incoming control connectors must evaluate to TRUE, or it may specify that at least one of them must evaluate to true. Whatever the start condition, all incoming connectors must be evaluated before the activity can start. If an activity has no incoming control connectors, it becomes ready when the process or block containing it starts. In addition, a Boolean expression called transition condition is associated with each control connector. Parameters from output containers of activities having already produced their results are followed as parameters referenced in transition conditions. When at run time an activity terminates successfully, all control connectors leaving this activity are determined and the truth value of the associated transition conditions is computed based on the actual values of their parameters. Only the end points of control connectors the transition conditions of which evaluated to TRUE are considered as activities that might be executed based on the actual context of the business process. Transition conditions model thus the context dependent actual flow of control within a business process (i.e. an instance of a model). Business processes encompass long running activities in general; such activities need to be allowed to be interrupted. Thus, termination of an activity does not necessarily indicate that the associated task has been finished successfully. In order to allow the measurement of successfulness of the work performed by an activity, a Boolean expression called exit condition is associated with each activity. Only the activities the exit conditions of which evaluated to TRUE in the actual context are treated as successfully terminated. For determination of the actual control flow precisely the successfully terminated activities are considered. Thus the logical expression of an exit condition, if specified, must evaluate to TRUE for control to pass from an activity or block.

Beside describing the potential flow of control and data between activities, a business process model also encompasses the description of the flow of the activities itself among "resources" actually performing the pieces of work represented by each activity. A resource may be specified as a particular program, person, a role, or an organizational unit. At run time tasks are resolved into requests to particular persons to perform particular activities, resulting in workitems for that person. Staff assignments are the means to distribute activities to the right people in the sequence prescribed by the control flow aspect of a business process model. Each activity in a process is assigned to one or more staff members defined in the FlowMark database. Whether an activity is started manually by the user or automatically by the FlowMark workflow manager, and whether it requires user interaction to complete or completes automatically, a staff member must be assigned to it. FlowMark staff definition entails more than identifying people at your enterprise to the FlowMark database. For each person defined, you can specify a level, an organization, and multiple roles. These attributes can be used at run time to dynamically assign activities to people with suitable attributes.

Process definition includes modeling of activities, control connectors between the activities, input/output container, and data connectors. A process is represented as a directed acyclic graph with the activities as nodes and the control/data connectors as the edges of the graph. The graph is manipulated via a built-in, event-driven, CUA compliant graphic editor. The data containers are specified as named data structures. These data structures themselves are specified via the Data Structure Definition facility. FlowMark distinguishes three main types of activities: program activities, process activities, and blocks. Program activities are implemented through programs. The programs are registered via the Program Definition facility. Blocks contain the same constructs as processes, such as activities, control connectors etc. They are however not named and have their own exit conditions. If the exit condition is not met, the block is started again. The block thus implements a Do Until construct. Process activities are implemented as processes. These subprocesses are defined separately as regular, named processes, with all their usual properties. Process activities offer great flexibility for process definition. They not only allow one to construct a process through permanent refinement of activities into program and process activities (top-down), but also to build a process out of a set of existing processes (bottom-up). In particular, process activities help to organize the modeling work if several process modelers are working together. They allow the team members to work independently on different activities. Program and process activities can be associated with a time limit. The time limit specifies how long the activity may take. If the time is exceeded, a designated person is notified. If this person does not react within another time limit, the process administrator is notified. It not only helps to recognize critical situations, but also to detect process deficiencies as all notifications are recorded in an audit trail.

All data structures used as templates for the containers of activities and processes are defined via the Data Structure Definition Facility. Data Structures are names and are defined in terms of elementary data types, such as float, integer, or string and references to existing data structures. Managing data structures as separate entities has the advantage that all interfaces of activities and their implementations are managed consistently in one place (similar to header files in programming languages).

All programs which implement program activities are defined via the Program Registration Facility. Registered for each program is the name of the program, its location, and the invocation string. The invocation string consists of the program name and the command string passed to the program.

Before process instances can be created, the process model must be translated to ensure the correctness and completeness of the process model. The translated version of the model is used as a template when a process instance is created. This allows one to make changes to the process model without affecting executing process instances. A process instance is started either via the graphical interface or via the callable process application programming interface. When a process is started, the start activities are located, the proper people are determined, and the activities are posted onto the work list of the selected people as work items. If a user selects a work item, i.e. the activity, the activity is executed and removed from the work list of any other user to whom the activity has been posted. After an activity has executed, its exit condition is evaluated. If not met, the activity is rescheduled for execution, otherwise all outgoing control connectors and the associated transition conditions are evaluated. A control connector is selected if the condition evaluates to TRUE. The target activities of the selected control connectors are then evaluated. If their start conditions are TRUE, they are posted to the work list of selected people. A process is considered terminated if all end activities have completed. To make sure that all end activities finish, a dead path elimination is performed. It removes all edges in the process graph which can never be reached due to failing transition conditions. All information about the current state of a process is stored in the database maintained by the server. This allows forward recovery in case of crashes.

Activity Execution in WFMS

As already indicated above, WFMS support the definition and execution of business processes. Those business processes are made up of a set of activities which are handled by different people at different places; business processes are therefore processed in most cases in a distributed environment comprising a network of a multitude of computer systems. The activities are generally implemented via programs that the user interacts with and that manage data that is associated with the process. A user typically interacts with the workflow management system via a graphical end user that represents the tasks to be performed by the user as icons. Work for a particular task is started by the user by double-clicking on the appropriate icon which in turn starts the program implementing the activity.

Figure 2:
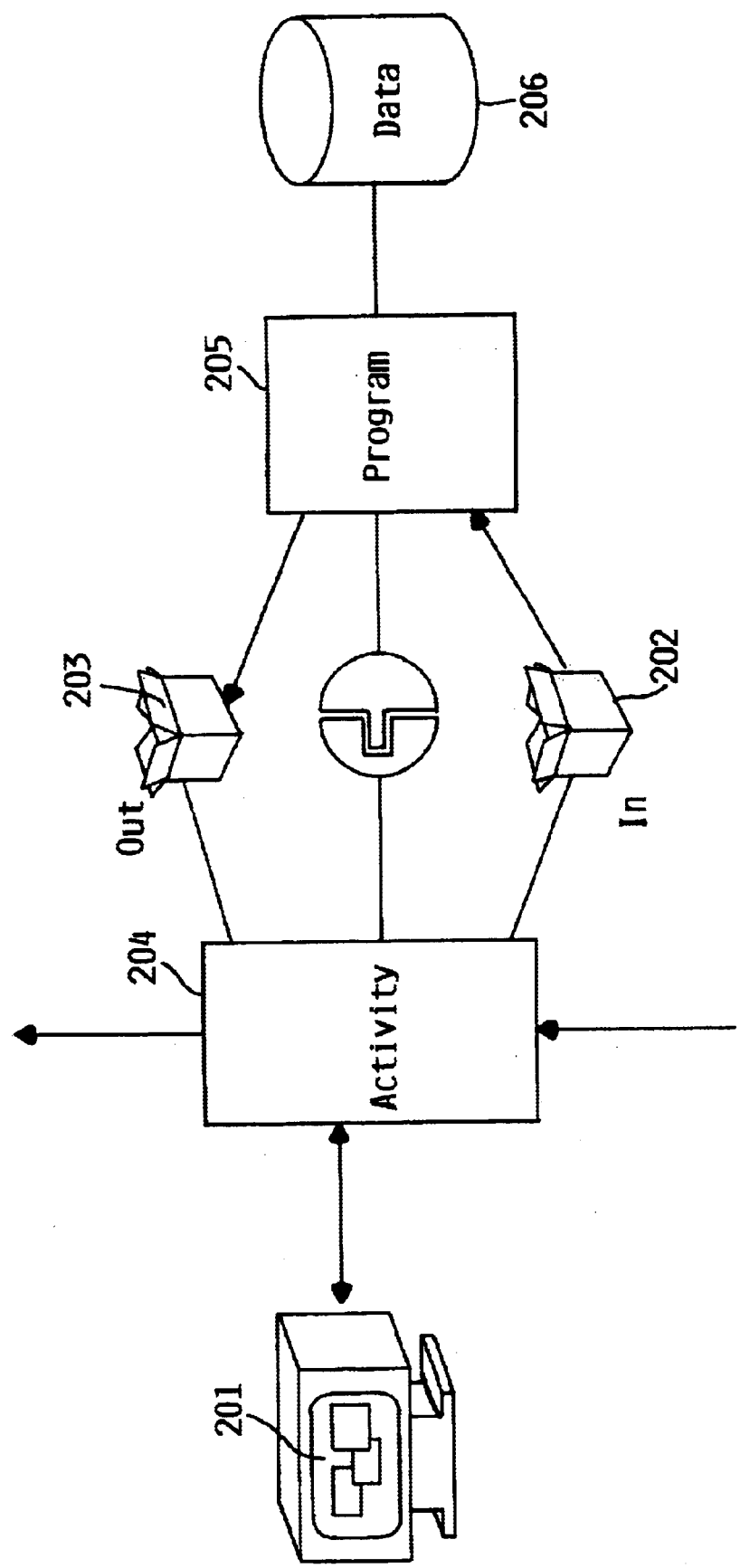
FIG. 2 is a diagram reflecting the second phase of the execution of an activity in a WFMS showing the execution of an activity implementation and its access to resource/objects by the activity implementation.

The execution of an activity within a process is performed in two phases visualized in FIG. 1 and FIG. 2. FIG. 1 shows the first phase in which staff resolution is performed. When a process is defined, each activity is assigned an expression (staff assignment) that describes who should perform the activity. The staff assignment is expressed as a query against the organizational database that is part of the workflow management system. When the workflow management system navigates to an activity, it uses that query to find the people who should perform the activity (staff resolution). A work item (101, 102, 103) is created for each of the selected persons. Depending on some settings, the work item is pushed immediately onto the work list (104, 105) of a selected person, or will be made part of the user's work list as the result of an explicit request.

FIG. 2 shows the flow of control when the user starts a work item from the work list representing the second phase of execution of an activity. After double-clicking the work-item representing the execution request of the activity on the work list (201), the workflow management system materializes the input container (202) and/or output container (203) and activates the program (205) that implements the activity (204). The program that is executed typically determines its context by obtaining some or all of the fields in the input container, interacts with the user, retrieves or modifies some resources/objects (206), or date data for short, modifies the context by storing this information in the output container, and then terminates. This constitutes the completion of the activity, and navigation through the process graph continues.

It is obvious that the data access must be fast. Otherwise, the user is waiting unproductively before any interaction can be performed. Which data is accessed is typically determined from context information in an input container, such as the name of a file that contains the image to be displayed. The speed with which the data is retrieved or modified depends on the available bandwidth between the location where the data resides and the location where the program executes. The data, if there is only low bandwidth between the program and the data, should be brought to a place with high bandwidth before the program is invoked. That means the user should not see the appropriate work item before the appropriate objects have been staged to a place with high bandwidth or a place as "close as possible" (in terms of access time) to the system executing the activity. Moreover, the original data to be accessed by the activity might be stored on a multitude of different systems. Further improvements might be achieved by concentrating copies of that data for usage by the activity on a single nearby computer system.

The current application proposes a new approach as to how this can be achieved within a workflow management system.

The Staging Solution

It is important for the productivity of the user that the program complete its access to data as fast as possible to avoid delays in interacting with the user. It is almost mandatory, in particular in a distributed environment, that large objects be brought very close (staged) to the executing program before the user perform the associated task. The same holds if the activity requires access to a large number of resources/objects distributed across a large number of different computer systems. This specification proposes a flexible method that allows the exploiters of workflow management systems to specify which data should be staged to which place.

Figure 3:
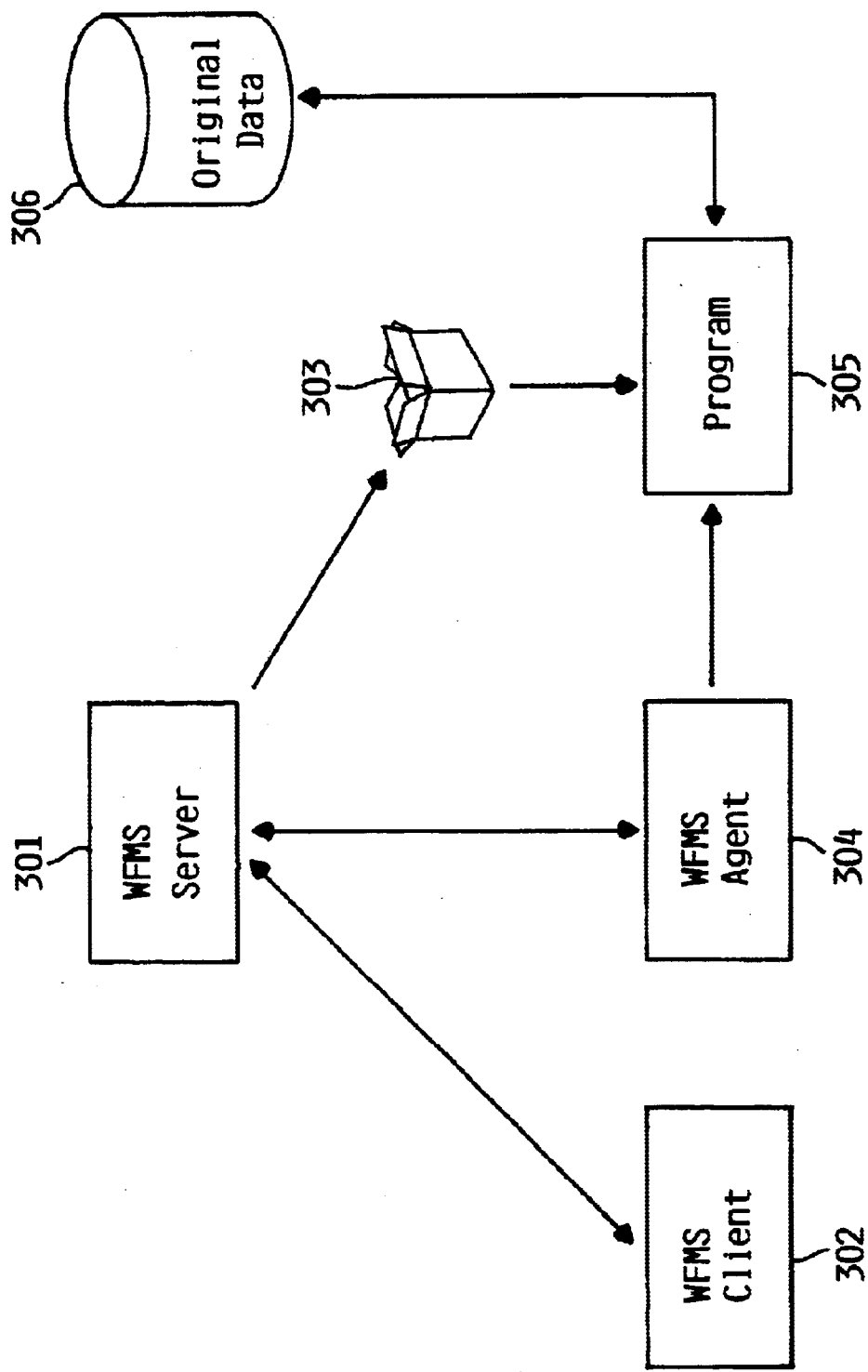
FIG. 3 shows the basic architecture of a WFMS for the support of clients and the execution of activity implementations.

FIG. 3 shows the basic architecture of a workflow management system for the support of clients and the execution of activity implementations. WFMS Server, WFMS agent, and WFMS client represent three major components of the workflow management system. The WFMS server (301) performs navigation through the process graph to determine the set of next activities to be performed after completion of an activity, performs staff resolution for a selected activity, and creates work items for selected users. The WFMS client (302) manages the work items for the user and implements together with the WFMS server the push or pull of work items. When a work item is selected by a user, the WFMS client indicates this to the WFMS server, which then materializes the input container and/or output container (303), and sends the materialized containers and appropriate activity implementation information such as the name of the program to be executed to the WFMS agent (304). The WFMS agent (304) invokes the specified program (305), provides the appropriate containers to the invoked program, and accepts application programming interface requests from the program for retrieval of data from the input container and storing of data into the output container. Moreover, it accesses further data (306) depending on the nature of the activity and, if the program finishes, informs the WFMS server about completion, so that the server can continue navigation.

Figure 4:
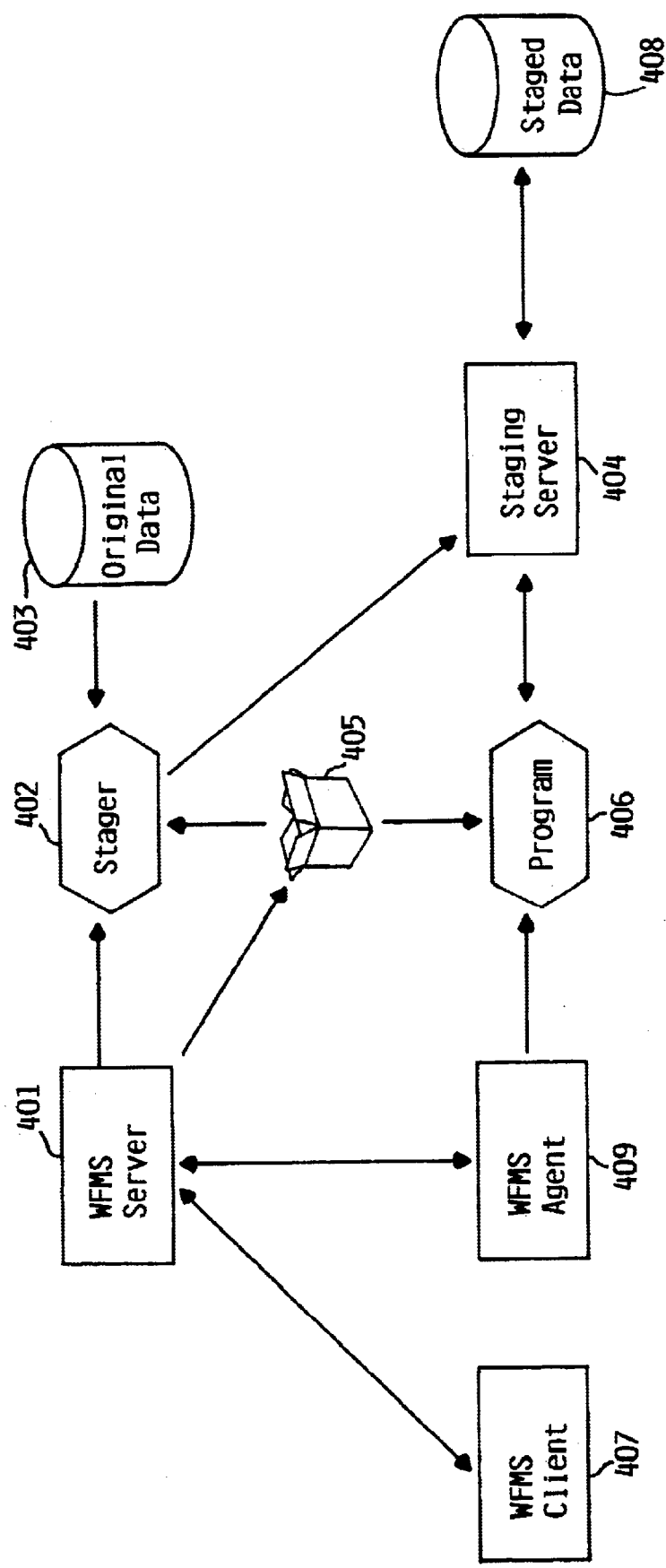
FIG. 4 shows the improved architecture of a WFMS for the support of clients and the execution of activity implementations according to the present invention.

This architecture can be extended to support the staging of objects as shown in FIG. 4. After the WFMS server (401) has performed staff resolution, it calls the stager (402) to move the resources/object(s) (403) to a pre-defined location, the WFMS staging location (408), such as the workstation of the selected user or to a LAN server to which the user has access. FIG. 4 shows an optional extension of that idea, wherein the resources/objects (403) are moved to a WFMS staging location whose access is managed by a separate WFMS staging server (404) (without a WFMS staging server the program (406) and the stager (402) would access the WFMS staging location (408) directly). The stager has access to the input container (405) with the same contents as will be passed to the program. This provides the staging program with the same amount of information as the program, so that the staging program can determine which object(s) should be moved. After the object has been successfully staged to the WFMS staging location, the WFMS makes the associated work item available to the WFMS client (407). When a work item is now selected by a user, the activity implementation (406) accesses the object(s) from the new location (408) at maximum speed.

When the activity implementation has completed, the WFMS agent (409) informs the WFMS server about this so that the WFMS server can continue navigation. If an object has been staged to a WFMS staging location, the WFMS server needs to perform two actions. First, it must call the staging program to copy the modified object back to the original place. Second, it must call the staging program to delete all copies of the object.

Clearly, the program that implements the activity and the staging program(s) that moves the objects close to the program need to be carefully designed and implemented together.

In the shown architecture, the stager is invoked by the WFMS server. Alternatively, the stager could be invoked by the WFMS client upon a request of the WFMS server.

Process Model Additions

Several additions to the process model of the workflow management system are required. The outlined proposal can be applied to most process models supported by workflow management systems. For illustrative purposes, the process meta model of IBM FlowMark is used. Therefore these extensions are specified in the FlowMark Definition Language (FDL), though any other type of specification could be used instead consistent with the proposed invention. It should be further mentioned that the extensions are only outlined to the extent of allowing a person skilled in the art to implement the additions. Further details are avoided.

According to the FlowMark FDL, each program that is the implementation of an activity is registered via the PROGRAM section. Keywords supplied in this section define the properties of the program for each of the operating system platform it is executing on. Further keywords need to be added that define which staging programs should be called and in which sequence. The following section of a FDL program registration shows the new keyword STAGER which is assigned the value of IMAGE.

```
PROGRAM
    STAGER IMAGE
```

This indicates that a staging program is invoked when an activity is implemented via this program and that the stager program has been registered under the name IMAGE.

The staging program itself must be registered with Flow-Mark together with all the properties that are needed to perform correct staging of the objects. Typical properties for such a program are:

The operating system on which the program is to be executed.

The name and path of the executable.

Whether it should be executed by the WFMS server or the WFMS client or some other places in the WFMS network.

The location where it should put the copied object(s); examples are: a separate WFMS Staging Location, the WFMS Agent, the WFMS Client, the WFMS Server or WFMS Staging Location managed by a separate WFMS Staging Server.

The following section of a stager registration shows the definition of a staging program.

```
STAGER IMAGE
    OS
        PATH 'E: \IMAGE\IMGCOPY.EXE'
    INVOCATION_MODE SERVER
```

In the spirit of having separate sections for each of the major pieces of the process model, a new section STAGER is introduced. This section keyword starts the definition of a staging program. The staging program is registered under the name IMAGE. This is the name which is used in the registration of programs, as shown in the previous figure. The OS2 keyword starts the definitions of the properties of the executable when the staging program is invoked in the OS/2 environment. In this case, the program is found in the directory IMAGE on the E: disk and the program name is IMGCOPY.EXE as identified via the PATH keyword.

The INVOCATION_MODE property indicates that the program is invoked on the server of the workflow management system.

The TARGET keyword starts the definition as to where the staging program should put the staged objects. Thus it identifies the WFMS staging location and the storage location within that system. In the example, the object is staged to the user's workstation (LOCATION USER) into the directory IMAGE on the E: disk as indicated by the PATH keyword; in this example case the WFMS staging location is identical with the WFMS Client.

In this example it is assumed that the object identification is maintained in the input container.

What is claimed is:

1. A plurality of computer systems acting as a workflow-management-system (WFMS), comprising:

a process-model defining at least one process-activity managed and executed by said WFMS, a plurality of WFMS-clients, each WFMS client executing on a respective computer system of said plurality of computer systems;

a plurality of WFMS-agents;

a WFMS-server, said WFMS-server performing navigation through said process-model and performing resolution by
(a) selecting a next-process-activity to be executed by said WFMS,
(b) selecting a WFMS-agent to execute said next-process-activity, and
(c) selecting a WFMS-client to control execution of said next-process-activity by a work-item, said WFMS client executing on a first computer system of said plurality of computer systems; and a stager invoked by said WFMS-server according to said process-model, said stager being designated by said process-model independently of said WFMS-client and independently of said WFMS-agent said stager storing resources required for execution of said next-process-activity, said resources being obtained from at least one source-location and being stored at a WFM-staging-location on a second computer system of said plurality of computer systems, said first and second computer systems being different computer systems, said stager storing said resources required for execution of said next-process activity responsive to said WFMS-server performing said resolution;

wherein said WFMS-agent uses said resources from said WFMS-staging-location for execution of said next-process-activity; and wherein said WFMS-server provides said work-item to said selected WFMS-client for presentation to a user only after said resources have been stored at said WFMS-staging-location.

2. The WFMS of claim 1, wherein:
said WFMS-agent stores output generated by execution of said next-process-activity at said WFMS-staging-location; and
said stager, after completion of said next-process-activity, re-stores said output to said source-location.

3. The WFMS of claim 2, wherein access to said WFMS-staging-location is managed through a WMFS-staging-server.

4. The WFMS of claim 2, wherein said stager is called by one of the set comprising: (a) said WFMS-server, and (b) said WFMS-agent.

5. The WFMS of claim 2, wherein:
said process-activity has associated with it at least one input-container; and
said resources are determined by said stager from the contents of said input-container of said next-process-activity.

6. The WFMS of claim 1, wherein said WFMS-staging-location is selected dynamically from a predefined set of WFMS-staging-locations.

7. The WFMS of claim 1, wherein said stager is located on the same computer system as said WFMS-server.

8. The WFMS of claim 1, wherein said WFMS-staging-location and said WFMS-agent are located on the same computer system.

9. The WFMS of claim 1, wherein access to said WFMS-staging-location is managed through a WMFS-staging-server.

10. A method of staging resources in a Workflow-Management-System (WFMS), said WFMS comprising a process-model defining at least one process-activity managed and executed by said WFMS, said WFMS performing navigation through said process-model, said method comprising the computer-executed steps of:

resolving a next-process-activity, said resolving step comprising the steps of:
(a) selecting a next-process-activity to be executed by said WFMS,
(b) selecting a WFMS-agent to execute said selected next-process-activity, and
(c) selecting a WFMS-client to control execution of said next-process activity by a work-item, said WFMS-client executing on a first computer system;

invoking a stager according to said process-model, said stager being designated by said process-model independently of said WFMS client and independently of said WFMS-agent, said stager staging stored resources required for execution of said next-process-activity from at least one source-location to a WFM-staging-location on a second computer system, said second computer system being different from said first computer system, said staging step being performed responsive to said resolving step;

presenting a work-item to a user, said step of presenting a work-item to a user being performed after said staging step, said work-item allowing said user to control execution of said next-process-activity from said selected WFMS-client;

accessing said resources from said WFM-staging-location, said accessing step being performed by said WFMS agent; and executing said next-process-activity in said WFMS-agent using said resources from said WFMS-staging-location.

11. The method of staging resources of claim 10, further comprising the steps of:

storing output generated by said step of executing said next-process-activity into said WFM-staging-location, said storing step being performed by said WFMS-agent; and restoring said output to said source-location after completion of said next-process-activity.

12. The method of staging resources of claim 11, wherein in said staging-step said resources are determined from the contents of one or more input-containers of said next-process-activity, each said input-container being associated with said next-process-activity.

13. The method of staging resources of claim 10, wherein said WFMS-staging-location is selected dynamically from a predefined set of WFMS-staging-locations.

* * * * *